United States Patent Office 2,773,892
Patented Dec. 11, 1956

2,773,892

1-AMINO-1-HALO-2,2-DICYANOETHYLENES AND PREPARATION OF SAME

Ernest L. Little, Jr., Wilmington, Del., assignor to E. I. du Pont de Nemours and Company, Wilmington, Del., a corporation of Delaware No Drawing. Application May 31, 1955,
Serial No. 512,273

6 Claims. (Cl. 260—465.5)

This invention is concerned with new nitrogen-containing compounds and a process for their preparation, and relates more particularly to dicyanoethylene derivatives.

Cyanohydrocarbons having a plurality of cyano groups are highly reactive and are of interest as intermediates in the preparation of valuable derivatives. It is known to produce compounds having a plurality of cyano groups by reactions which involve the dimerization or trimerization of metal salts of nitriles and treatment with a halogen halide. Thus an article by Richard Meier, Ber. 86, 1491 (1953), teaches that ethanetetracarbonitrile is formed from sodiomalononitrile when a solution of the nitrile in absolute alcohol is treated with nitrous oxide and neutralized with acid. U. S. Patent No. 2,719,861, issued October 4, 1955, discloses the formation of 2-amino-1,3,3-tricyano-2-propene from an alkali metal derivative of malononitrile. Cyclic trimers of acetonitrile, propionitrile, and malononitrile have been formed by treatment of the nitriles with sodium alcoholates and other basic materials (Schenk and Finken, Ann. 462, 273 (1928), and Schwarze, J. Prakt. Chem. (2), 42, 1 (1890)). Other reactions of this type are disclosed in Migrdichian, "The Chemistry of Organic Cyanogen Compounds," pages 351–358 (Reinhold Publishing Corp., New York, 1947).

Cyanoform and the metal salts thereof already contain sufficient activating cyano groups to provide a highly reactive positive group, i. e., the replaceable hydrogen or metal atom. A process which would introduce a readily replaceable negative group, such as a halogen, without polymerization occurring, should provide a highly useful, low molecular weight intermediate for further syntheses.

It is an object of this invention to provide a new low molecular weight compound containing a plurality of activating cyano groups and an active halogen. Another object is to provide a process for preparing such a compound from a metal salt of cyanoform. Other objects will become apparent from the specification and claims.

These objects are accomplished by reacting two moles of hydrogen halide with one mol of an alkali metal salt of cyanoform to produce a 1-amino-1-halo-2,2-dicyanoethylene. In this reaction hydrogen halide gas can be reacted directly with the alkali metal salt of cyanoform, but better results are obtained by bringing the reactants together in solution. The reaction mechanism by which this unexpected product is obtained has not been determined, but the over-all reaction is illustrated by the following equation in which M represents the alkali metal:

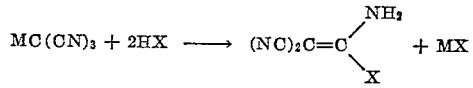

When HX represents hydrogen fluoride the product is 1-amino-1-fluoro-2,2-dicyanoethylene; with hydrogen chloride the product is 1-amino-1-chloro-2,2-dicyanoethylene; with hydrogen bromide the product is 1-amino-1-bromo-2,2-dicyanoethylene and with hydrogen iodide the product is 1-amino-1-iodo-2,2-dicyanoethylene.

The reaction is preferably carried out by passing dry hydrogen halide into an anhydrous solution of an alkali metal salt of cyanoform, particularly in acetone solution, until the reaction is complete. The alkali halide formed precipitates from acetone solution and is removed by filtration. The 1-amino-1-halo-2,2-dicyanoethylene may be recovered from the filtrate in various ways; for example, it can be precipitated by treatment of the filtrate with a non-solvent for the dicyanoethylene derivative, such as n-heptane. The reaction is conveniently carried out at temperatures ranging from 50° C. to 0° C. or below, but preferably in the lower temperature range. The pressure is not critical.

Instead of passing hydrogen halide into a solution of the alkali salt of cyanoform, a solution of hydrogen halide can be used, e. g., by passing an aqueous solution of the cyanoform salt and an alkali halide through an acid ion exchange resin to generate hydrogen halide in the reaction mixture. This is illustrated in Example III.

The potassium salt of cyanoform used in the examples of this invention can be prepared by the reaction of potassium cyanide with bromomalononitrile:

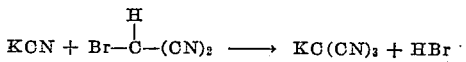

as described by Cox and Fontaine in Bulletin de la Société Chemique de France, July–August, 948–949 (1954). The sodium, lithium, rubidium and cesium salts, which can be prepared in a similar way, can also be used in the practice of this invention.

The invention is illustrated by the following examples in which parts are by weight.

*Example I*

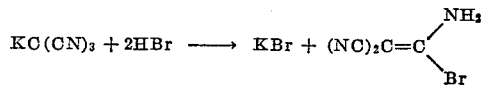

Dry hydrogen bromide was passed into a solution of 6.4 parts of the potassium salt of cyanoform in 200 parts of acetone for ten minutes. The precipitate of potassium bromide (5.5 parts) was separated by filtration, and the filtrate was allowed to stand overnight. The filtrate was then poured into 1095 parts of n-heptane, and 1 part of 1-amino-1-bromo-2,2-dicyanoethylene was obtained as a white solid. The identity of the solid was determined by its infrared spectra, using data obtained from the compound prepared according to the process described in Example III.

1-amino-1-bromo-2,2-dicyanoethylene is a white solid which sublimes above 100° C. but does not melt below 300° C. It is soluble in water and acetone and insoluble in diethyl ether and heptane. A water solution acts as a strong dibasic acid having a pK$_A$ of 1.9.

*Example II*

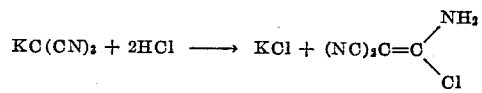

Dry hydrogen chloride was passed into a solution of 6.4 parts of the potassium salt of cyanoform in 200 parts of acetone for ten minutes. After standing for one-half hour at 0° C., 3.5 parts of potassium chloride precipitate was separated by filtration, and the filtrate was saturated with hydrogen chloride. The reaction mixture was allowed to stand at Dry Ice temperature overnight and was then poured into 1460 parts of n-heptane. The oil which separated was extracted with 360 parts diethyl ether. On evaporation, the diethyl ether extract yielded 4 parts (63.4% yield) of 1-amino-1-chloro-2,2-dicyanoethylene as a light yellow solid. The identity of the product was determined by its infrared spectra and analysis.

*Anal.*—Calcd. for $C_4H_2N_3Cl$: C, 37.7; H, 1.57; N, 33.0; Cl, 27.8. Found: C, 37.99; H, 1.73; N, 32.89; Cl, 27.46.

This material, like the bromo compound, sublimes above 100° C., but does not melt below 300° C. In water solution it also acts as a strong acid ($pK_A$ 1.9). When this compound is irradiated with ultraviolet light at 3650 A., it emits a pink luminescence, and, when irradiated with X-rays, it emits a white luminescence. The latter property makes this compound useful as a phosphor for fluoroscopic screens.

*Example III*

A solution of 56.5 parts of a sodium salt of cyanoform containing 14% sodium bromide in 500 parts of distilled water was slowly passed through a column packed with one mole of a sulfonic acid ion exchange resin. Water was removed from the strongly acidic effluent by vacuum distillation at room temperature. The resulting brown solid (40 parts) was heated in a sublimation tube at 100–120° C. and 5 mm. pressure. Five parts of 1-amino-1-bromo-2,2-dicyanoethylene was obtained as a light yellow sublimate.

*Anal.*—Calcd. for $C_4H_2N_3Br$: C, 27.9; H, 1.16; N, 24.4; Br, 46.4; N. E., 172 or 86. Found: C, 28.92, 28.50; H, 1.21, 1.21; N, 24.82, 24.92; Br, 44.35, 44.40; N. E. 87.8.

The 1-amino-1-halo-2,2-dicyanoethylenes of this invention are effective catalysts for the crosslinking of epoxide polymers, as demonstrated by the following: 1-amino-1-bromo-2,2-dicyanoethylene (1%) was suspended in a solution of an epoxidized polymer. A film of the mixture was then baked for thirty minutes at 170° C. to yield a film of crosslinked polymer.

The compounds are also effective insecticidal and fungicidal compositions. At 2% concentration in acetone solution, 1-amino-1-bromo-2,2-dicyanoethylene gave the following percent kills:

| | Percent |
|---|---|
| German roaches | 100 |
| Bean aphids | 90 |
| Two-spotted mites | 98 |
| House flies | 45 |
| Southern army worm | 30 |

Since many different embodiments of the invention may be made without departing from the spirit and scope thereof, it is to be understood that the invention is not limited by the specific illustrations except to the extent defined in the following claims.

What is claimed is:

1. A compound of the class consisting of 1-amino-1-halo-2,2-dicyanoethylenes.

2. The compound 1-amino-1-bromo-2,2-dicyanoethylene.

3. The compound 1-amino-1-chloro-2,2-dicyanoethylene.

4. The process for producing a 1-amino-1-halo-2,2-dicyanoethylene which comprises reacting two moles of a hydrogen halide with one mol of an alkali metal salt of cyanoform.

5. The process which comprises passing dry hydrogen halide into an anhydrous solution of an alkali metal salt of cyanoform until the reaction is complete and recovering the 1-amino-1-halo-2,2-dicyanoethylene formed.

6. The process which comprises treating an alkali metal salt of cyanoform with a strong aqueous solution of a hydrogen halide to form 1-amino-1-halo-2,2-dicyanoethylene.

References Cited in the file of this patent
UNITED STATES PATENTS 2,375,185    Bergel et al. _____ May 8, 1945